(12) United States Patent
Hayashi et al.

(10) Patent No.: US 8,419,246 B2
(45) Date of Patent: Apr. 16, 2013

(54) ILLUMINATION DEVICE FOR VEHICLE AND LIGHT SOURCE UNIT

(75) Inventors: Nobuki Hayashi, Toyota (JP); Kouichi Takeuchi, Okazaki (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 13/414,992

(22) Filed: Mar. 8, 2012

(65) Prior Publication Data
US 2012/0262937 A1   Oct. 18, 2012

(30) Foreign Application Priority Data

Apr. 13, 2011 (JP) ................................ 2011-089273

(51) Int. Cl.
*F21V 33/00* (2006.01)
(52) U.S. Cl.
USPC ............................ 362/501; 362/488; 362/520
(58) Field of Classification Search .................. 362/488, 362/501, 520
See application file for complete search history.

(56) References Cited

U.S. PATENT DOCUMENTS

| | | | | | |
|---|---|---|---|---|---|
| 6,000,822 | A | * | 12/1999 | Polizzi et al. | 362/488 |
| 7,607,809 | B2 | * | 10/2009 | Misawa | 362/501 |
| 7,866,860 | B2 | * | 1/2011 | Goto | 362/501 |
| 2001/0006465 | A1 | * | 7/2001 | Misawa et al. | 362/501 |
| 2011/0170304 | A1 | * | 7/2011 | Fujita | 362/501 |
| 2011/0241544 | A1 | * | 10/2011 | Murray et al. | 315/77 |

FOREIGN PATENT DOCUMENTS

JP  9-086273 A  3/1997

OTHER PUBLICATIONS

U.S. Appl. No. 13/414,270 to Nobuki Hayashi et al., filed Mar. 7, 2012.
U.S. Appl. No. 13/470,585 to Nobuki Hayashi, filed May 14, 2012.

* cited by examiner

*Primary Examiner* — Laura Tso
(74) *Attorney, Agent, or Firm* — Greenblum & Bernstein, P.L.C.

(57) ABSTRACT

An illumination device for a vehicle configured to illuminate an armrest on a door trim of the vehicle includes a light source and a light directing member. The light source is arranged above the armrest and has a light emitting portion configured to emit light toward the armrest. The light directing member is arranged so as to cover the light emitting portion from below. The light directing member is configured to direct the light emitted from the light emitting portion toward the armrest toward a front of the vehicle.

7 Claims, 11 Drawing Sheets

ILLUMINATION DEVICE FOR VEHICLE AND LIGHT SOURCE UNIT

CROSS REFERENCE TO RELATED APPLICATION

This application claims priority from Japanese Patent Application No. 2011-89273 filed Apr. 13, 2011. The entire content of this priority application is incorporated herein by reference.

FIELD OF THE INVENTION

The present disclosure relates to an illumination device for a vehicle and a light source unit.

BACKGROUND OF THE INVENTION

A known light source unit for a vehicle is arranged above an armrest and configure to illuminate the armrest. With the illumination, the visibility of switches on the armrest improves.

In such a configuration, light emitted from a light source toward the armrest may be reflected by the upper surface of the armrest and directed to eyes of an occupant. As a result, the occupant may be dazzled by the reflected light. Furthermore, because of the reflected light, a mirror image of the light source may appear on the upper surface of the armrest. This may decrease the decent appearance. Upper surfaces of many armrests are polished to provide decent appearances, that is, the upper surfaces have high light reflectivities. Therefore, the above problems are more likely to occur.

An illumination device or a light source unit arranged in an interior part, such as a door trims, needs to be configured to direct light emitted from the light source toward a specific direction so that the light does not travel toward eyes of an occupant.

SUMMARY OF THE INVENTION

The present invention has been made in view of the aforementioned circumstances. An objective of the present invention is to provide an illumination device configured to illuminate an inside door handle of a vehicle so that high visibility of the door handle can be achieved.

An illumination device for a vehicle configure to illuminate an armrest on a door trim of the vehicle includes a light source and a light directing member. The light source is arranged above the armrest. The light source has a light emitting portion configured to emit light toward the armrest. The light directing member is arranged so as to cover the light emitting portion from below and configured to direct the light emitted from the light emitting portion toward the armrest toward a front of the vehicle.

When beams of the light directed toward the front of the vehicle are reflected by the armrest, the reflected beams of the light travel toward the front. The reflected beams of the light are less likely to travel toward the rear of the vehicle. Namely, the reflected beams of the light are less likely to reach eyes of an occupant seated more to the rear of the vehicle than the armrest.

According to the technology described herein, an illumination device for a vehicle configured to direct light emitted from a light source toward a specific direction can be provided. Furthermore, a light source unit configured to direct light emitted from a light source toward a specific direction can be provided.

DETAILED DESCRIPTION OF THE PREFERRED EMBODIMENTS

First Embodiment

Figure 1:
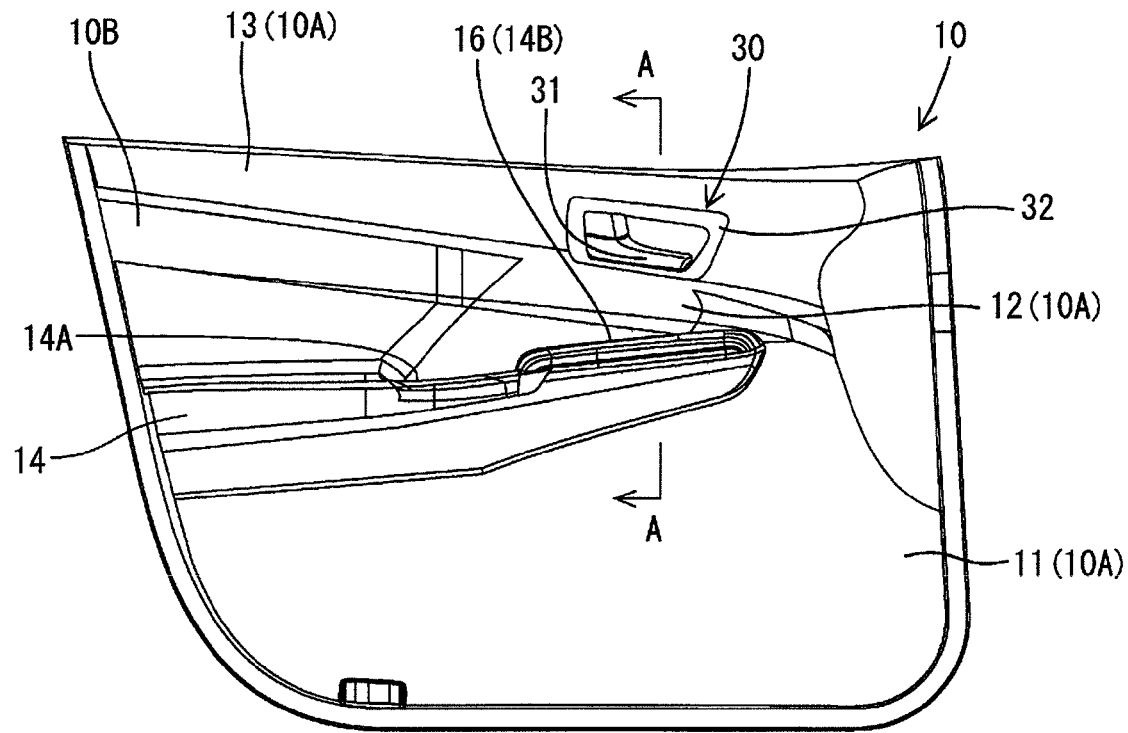
FIG. 1 is a front view of a door trim for a vehicle to which an illumination device for a vehicle according to the first embodiment is mounted.

The first embodiment will be explained with reference to FIGS. 1 to 10. A door trim 10 illustrated in FIG. 1 is an interior part of a vehicle to be attached to an interior surface of an inner panel of the vehicle. The door trim 10 and the inner panel are parts of a door of the vehicle.

The door trim 10 is used to improve appearance of the interior of the vehicle and passenger comfort in the vehicle. The door trim 10 includes a trim board 10A and an ornament 10B mounted to the trim board 10A. As illustrated in FIG. 1, the trim board 10A is constructed of three parts, a lower board 11 in the lower section, a middle board 12 in the middle section, and an upper board 13 in the upper section. The trim board 10A is not limited to such a configuration and can be constructed of a single part.

Figure 4:
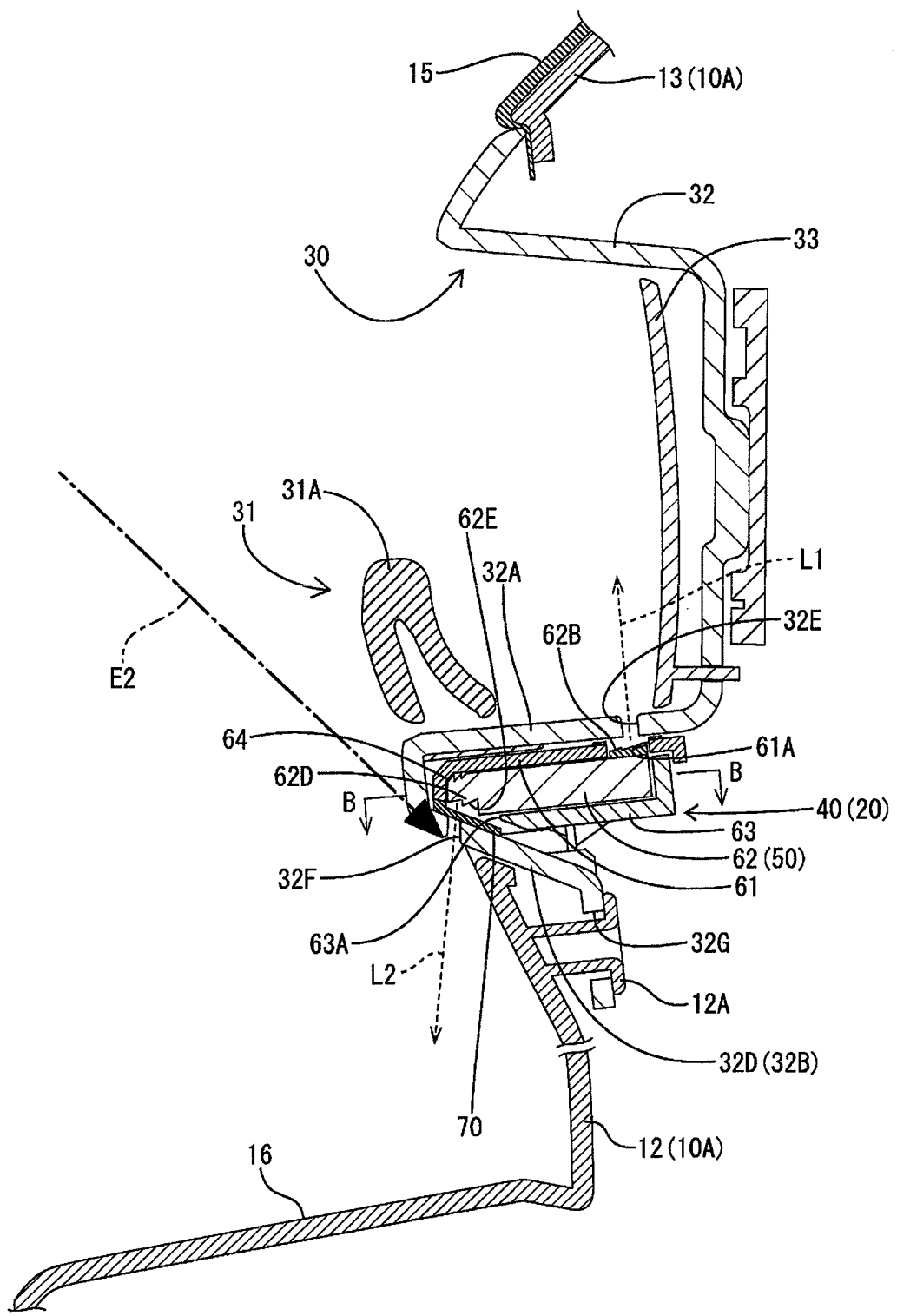
FIG. 4 is a cross-sectional view of the illumination device along line A-A in FIG. 1.

The lower board 11, the middle board 12, and the upper board 13 are made of synthetic resin such as polypropylene or synthetic resin mixed with natural fibers such as kenaf fibers. As illustrated in FIG. 4, a door trim skin 15 is attached to a part of or an entire inner surface of the door trim 10. The boards 11, 12 and 13 are connected together by inserting mounting bosses thereof into respective through holes of the respective boards 11, 12 and 13, and by welding tips of the bosses. The welding of the tips of the bosses may be performed by ultrasonic welding. Alternatively, the boards 11, 12 and 13 may be connected with screws, hooks, or other types of fastening members.

As illustrated in FIG. 1, the middle board 12 includes an armrest 14 for an occupant to rest his or her arm. The armrest 14 projects toward the inner side of the interior of the vehicle. The armrest 14 has a recess 14A in which a pull handle (not illustrated) for opening and closing the door is arranged. The armrest 14 has an opening in the upper surface so that the occupant can reach the pull handle through the opening to open or close the door with his or her fingers.

An inside handle well 30 is provided in the upper board 13 near a junction thereof with the middle board 12. A handle 31A (a holding portion) of an inside handle assembly 31 is held in the inside handle well 30. The inside handle assembly 31 is used to open and close the door of the vehicle. A switch base 16 including switches is arranged on the upper surface 14B of the armrest 14 below the inside handle well 30.

As illustrated in FIG. 4, the illumination device 20 includes a light source 50 and a light directing member 70. The light source 50 is configured to illuminate the inside of the inside handle well 30 and the armrest 14 especially the switch base 16. The light directing member 70 is configured to direct light emitted toward the armrest 14 to the front of the vehicle. The inside handle well 30 includes an inside handle bezel 32 and an inside handle cover 33. The inside handle well 30, the inside handle bezel 32, and the inside handle cover 33 may be hereinafter referred to as the well 30, the bezel 32, and he cover 33, respectively.

Figure 2:
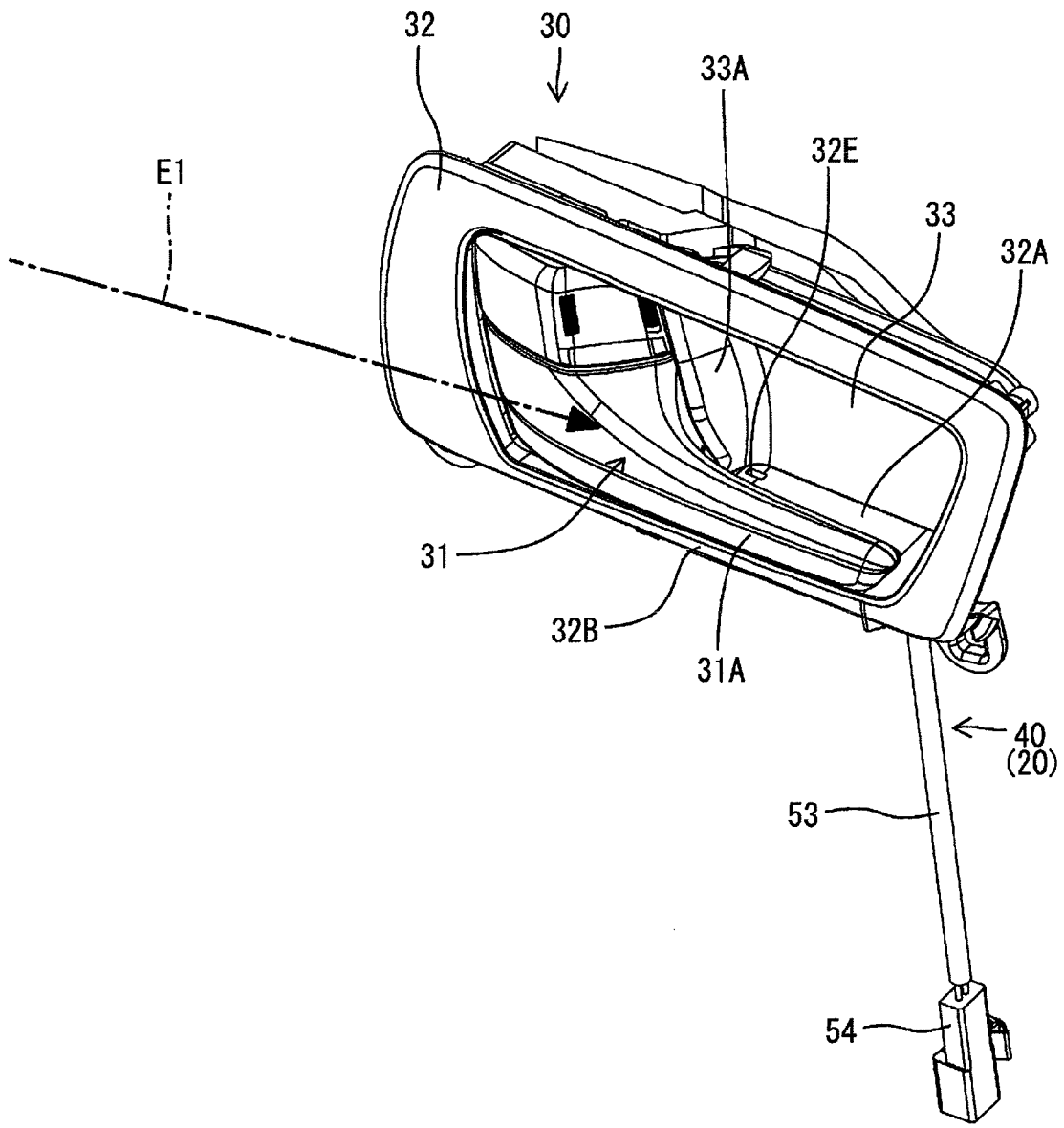
FIG. 2 is a perspective view of an inside handle.
Figure 3:
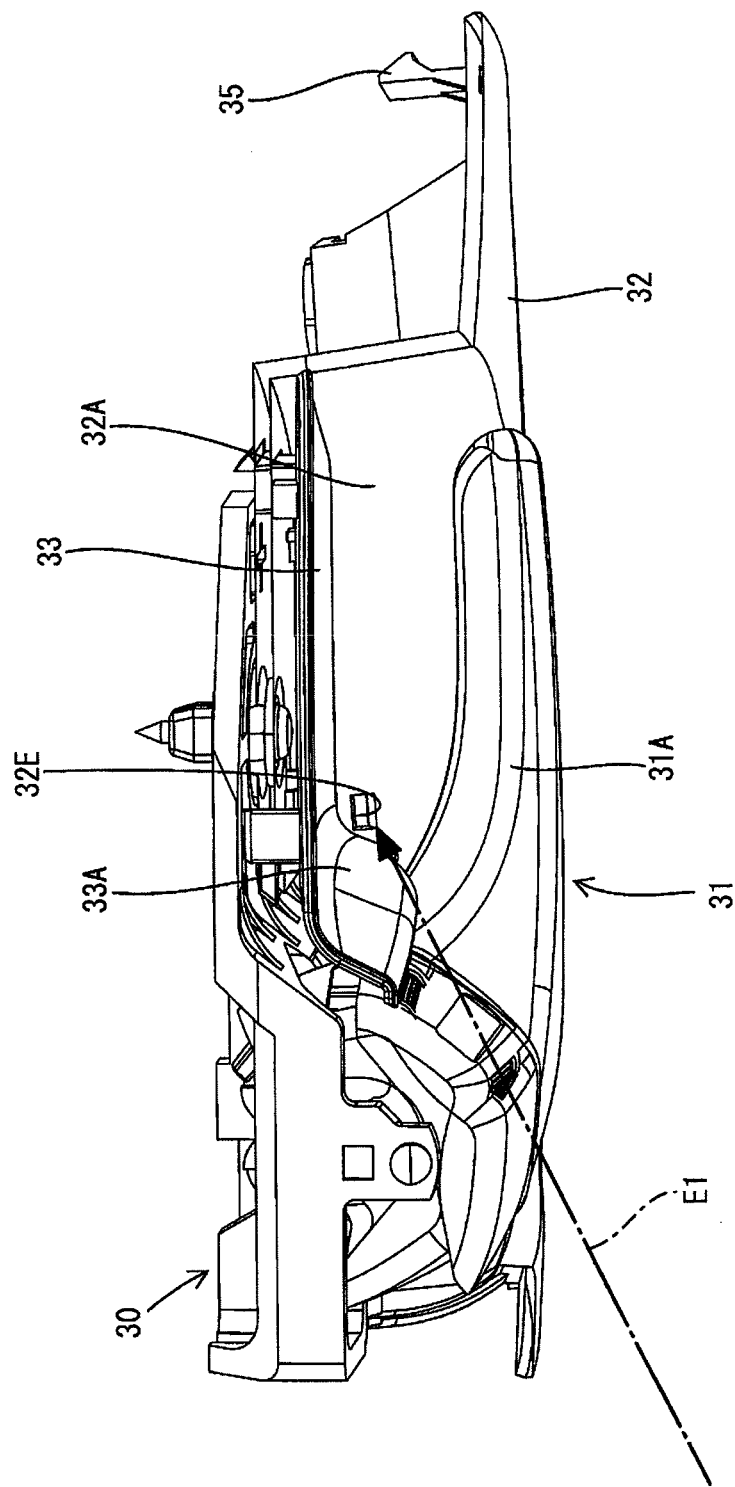
FIG. 3 is a plan view of the inside handle.

As illustrated in FIGS. 2 and 4, the bezel 32 has a rectangular front-view shape and an opening on the inner side of the interior of the vehicle. As illustrated in FIG. 3, the bezel 32 has a hook 35 projecting toward the interior of the vehicle and hooked to the trim board 10A. The cover 33 is mounted so as to cover the back wall of the bezel 32, that is, the cover 33 is a part of the back wall.

The light source 50 is arranged below the lower wall 32A of the bezel 32 (i.e., the lower wall of the inside handle well 30). As illustrated in FIG. 4, an extending wall 32B extends from edges of the lower wall 32A so as to cover the light source 50 from below and sides. Namely, a recess defined by the lower wall 32A and the extending wall 32B is used as a light source holding recess for holding the light source 50. The light source 50 is held in the light source holding recess.

The lower wall 32A has a light exit hole 32E through which light emitted from the light source 50 exits and enters into the inside handle well 30. The extending wall 32B includes a sloped portion 32D on the lower side. The sloped portion 32D inclines toward the inner side of the interior of the vehicle. The sloped portion 32D has a lower light exit hole 32F (a lower light exit portion) through which light emitted from the light source 50 exits.

The light emitted from the light source 50 enters into the inside handle well 30 through the light exit hole 32E and illuminates the inside of the inside handle well 30. Furthermore, the light emitted from the light source 50 exits downward through the lower light exit hole 32F and illuminates the armrest 14 arranged under the lower light exit hole 32F.

The lower light exit hole 32F is formed in the sloped portion 32D. Therefore, the occupant is less likely to recognize the lower light exit hole 32F (see line E2 in FIG. 4 indicating a line of sight of the occupant), that is, the decent appearance can be provided.

As illustrated in FIG. 4, the extending wall 32B has a mounting hole 32G through which a mounting boss 12A projecting from the middle board 12 is passed. The mounting boss 12A is passed through the mounting hole 32G and the tip thereof is welded by ultrasonic welding or other type of welding method. As a result, the extending wall 32B of the bezel 32 is connected to the middle board 12.

Figure 5:
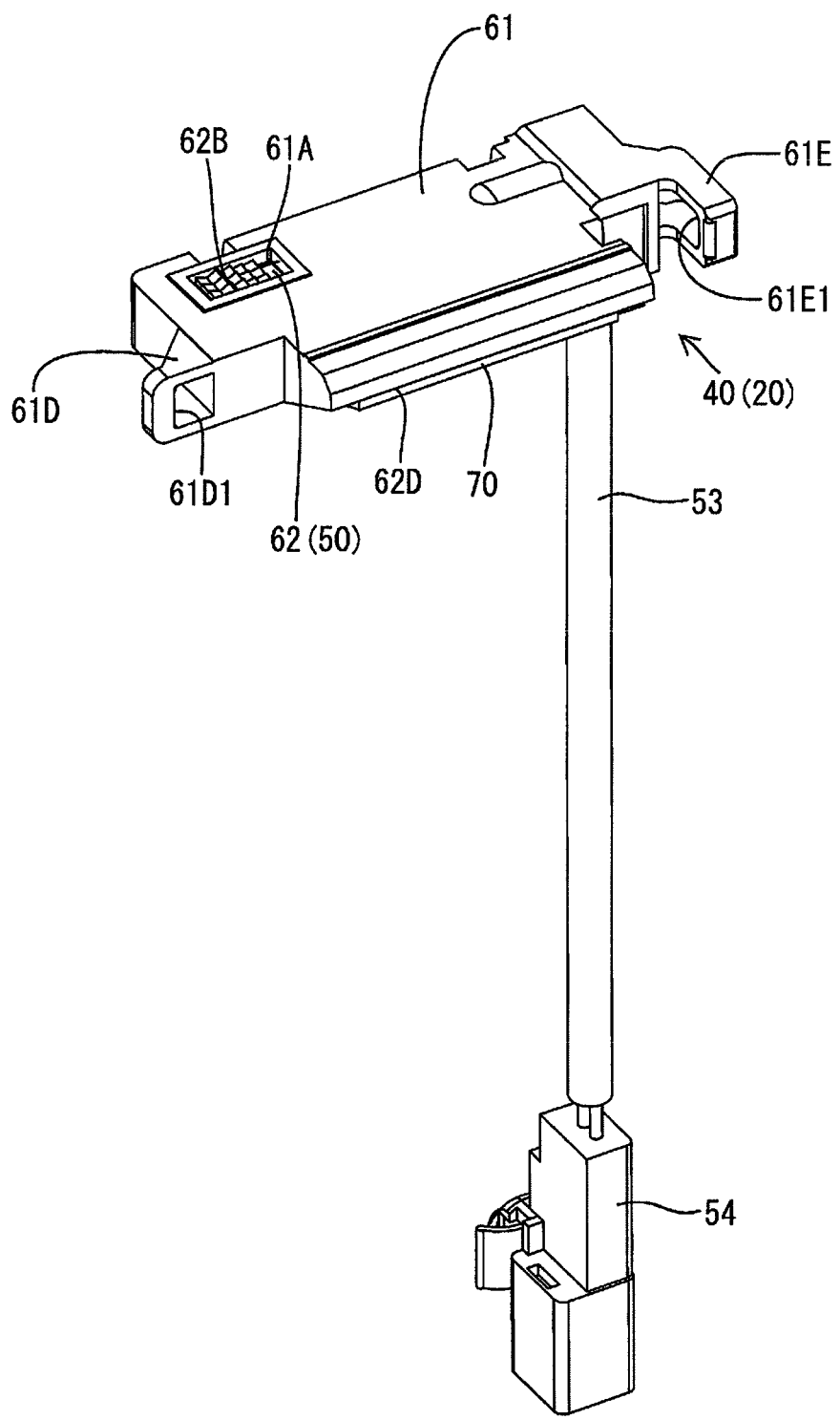
FIG. 5 is a perspective view of a light source unit of the illumination device in FIG. 4.
Figure 6:
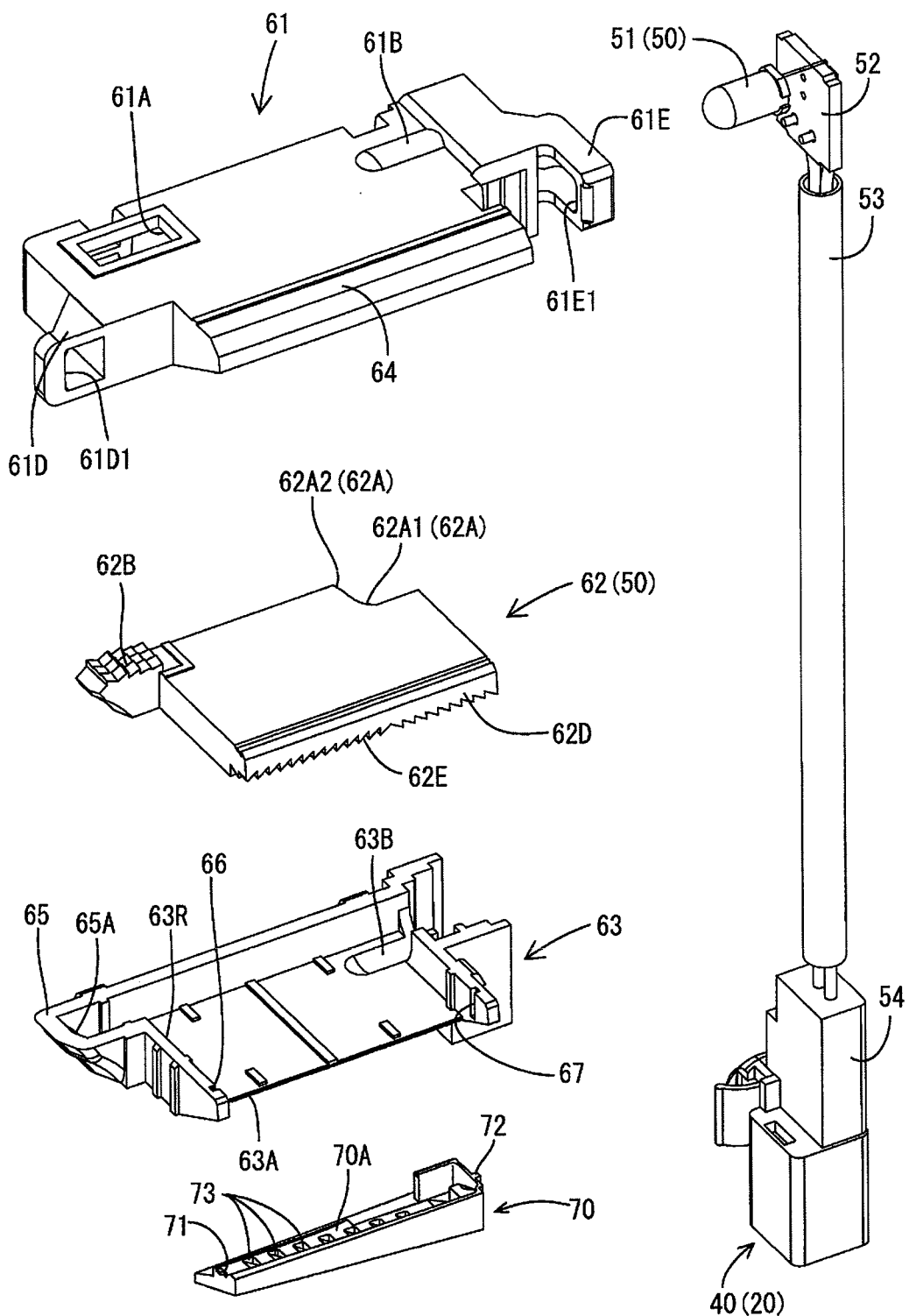
FIG. 6 is an exploded perspective view of the light source unit of the illumination device in FIG. 4.

Next, a light source unit 40 including the light source 50, the light directing member 70, and covers (an upper cover 61 and a lower cover 63) will be explained. As illustrated in FIGS. 5 and 6, the light source 50 includes an LED 51 (a light source main body) and a lens 62 (a light guide member). The lens 62 has a rectangular flat plate-like front-view shape. The LED 51 and the lens 62 are arranged inside the upper cover 61 and the lower cover 63. The lens 62 and parts of the covers 61 and 63 are configured to direct beams of light emitted from the LED 51 to the light exit hole 32E then to the well 30 and to the lower light exit hole 32F then to the armrest 14.

As illustrated in FIG. 6, the LED 51 is mounted on a circuit board 52. Electrical wires 53 are connected to the circuit board 52 at one end and to a connector 54 at the other end. The LED 51 is electrically connected to a power supply (not illustrated) via the electrical wires 53 and the connector 54.

Figure 7:
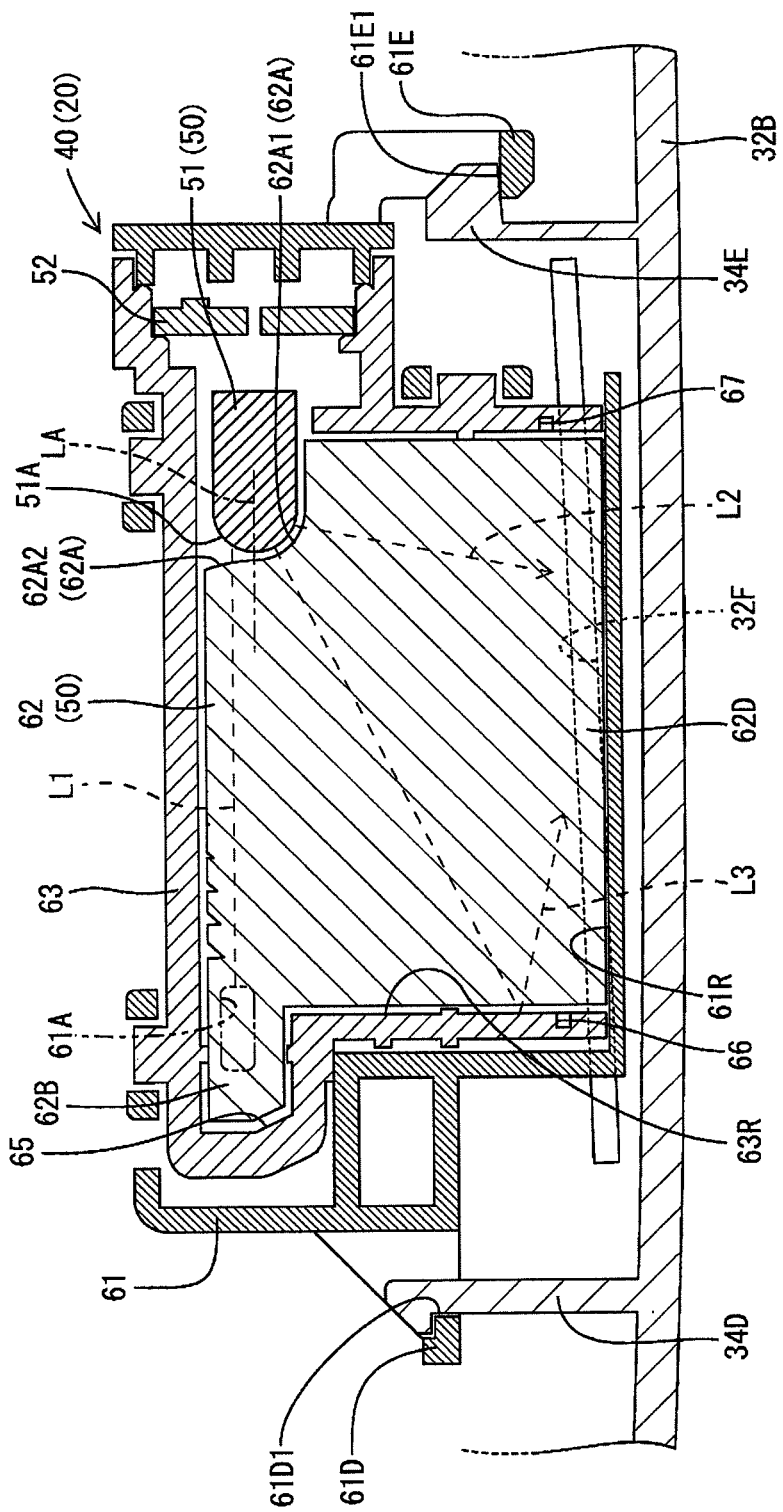
FIG. 7 is a cross-sectional view of the light source along line B-B in FIG. 4.

The lens 62 is made of synthetic resin having a high capability of light transmission (or highly transparent synthetic resin) such as acrylic. As illustrated in FIG. 7, a corner of the lens 62 close to the LED 51 is cut off along a curved line and a light entrance surface 62A is provided. The LED 51 is arranged such that a light emitting surface 51A thereof faces the light entrance surface 62A. With this configuration, light emitted from the LED 51 enters the light entrance surface 62A.

The LED 51 is arranged with a light axis LA thereof aligned along the front-to-rear direction of the vehicle (the right-to-left direction in FIG. 7). Light emitted from the LED 51 through the light emitting surface 51A three-dimensionally radiates around the light axis LA within a specified angle range. The intensity of emitted light is significantly high along the light axis LA and tends to decrease as an angle to the light axis LA increases.

The upper cover 61 and the lower cover 63 are made of synthetic resin. The covers 61 and 63 have recesses 61B and 63B in the inner surfaces thereof, respectively. The LED 51 is arranged in the recesses 61B and 63B.

As illustrated in FIG. 7, the upper cover 61 has projecting portions 61D and 61E projecting from the respective sides thereof toward respective directions along the front-to-rear direction of the vehicle (or the right-to-left direction in FIG. 7). The projecting portions 61D and 61E have mounting holes 61D1 and 61E1, respectively. The mounting holes 61D1 and 61E1 are through holes. The bezel 32 includes mounting hooks 34D and 34E projecting from the extending wall 32B toward the outer side of the interior of the vehicle (the upper side of FIG. 7). The mounting hooks 34D and 34E are fitted in the mounting holes 61D1 and 61E1, respectively. As a result, the light source 50 is mounted to the bezel 32.

The inner surface 61R of the upper cover 61 and the inner surface 63R of the lower cover 63 are light reflecting surfaces configured to reflect light. The light reflecting surfaces may be prepared by making the upper cover 61 and the lower cover 63 from material in highly light reflective color such as white. Alternatively, the light reflecting surfaces my be prepared by applying highly light reflective paint, such as white paint, to the inner surfaces of the upper cover 61 and the lower cover 63.

As illustrated in FIG. 6, the upper cover 61 has an end wall 64 on the inner side of the interior of the vehicle. The end wall 64 is arranged opposite the lower light exit hole 32F. The end wall 64 declines toward the inner side of the interior of the vehicle (or a side away from the LED 51) so as to reflect light hitting the inner surface thereof downward or toward the armrest 14. Namely, the inner surface of the end wall 64 is a part of the light guide member configured to guide some beams of light from the LED 51 toward the armrest 14.

As illustrated in FIG. 7, the lower cover 63 has projecting portion 65 that projects from an end thereof away from the LED 51 toward the rear of the vehicle. The projecting portion 65 is arranged on the same line on which the light axis LA of the LED 51 is arranged in plan view. An upper light emitting portion 62B of the lens 62 is arranged in space surrounded by walls of the projecting portion 65. As illustrated in FIG. 6, the bottom surface 65A of the projecting portion 65 inclines toward the rear of the vehicle (or the side away from the LED 51). With this configuration, light hitting the bottom surface 65A of the projecting portion 65 is reflected upward.

As illustrated in FIGS. 4 and 5, the upper cover 61 has a through hole 61A in an area opposite the light exit hole 32E of the bezel 32. The through hole 61A is formed so as to overlap the upper light emitting portion 62B of the lens 62 in plan view. Namely, the upper light emitting portion 62B is arranged so as to face the light exit hole 32E. With this configuration, the light emits upward from the upper light emitting portion 62B.

As illustrated in FIGS. 4 and 5, the lower cover 63 has a through hole 63A in an area opposite the lower light exit hole 32F. A lower light emitting portion 62D formed on the lower surface of the lens 62 is visible through the through hole 63A. With this configuration, the light emits downward from the lower light emitting portion 62D. Namely, the lower light emitting portion 62D is arranged so as to face the lower light exit hole 32F. As illustrated in FIG. 7, each of the lower light exit hole 32F and the lower light emitting portion 62D (or a light emitting surface 62E) has an elongated shape that extends along the front-to-rear direction of the vehicle.

As illustrated in FIG. 7, the light entrance surface 62A includes a first curved surface 62A1 on the lower light emitting portion 62D side and a second curved surface 62A2 on the upper light emitting portion 62B side. The first curved surface 62A1 has a shape such that light from the LED 51 (indicated by arrow L2 in FIG. 7) is diffused in a wide range. The second curved surface 62A2 has a shape with a smaller curvature than that of the first curved surface 62A1 such that light from the LED 51 (indicated by arrow L1 in FIG. 7) is directed straight toward the upper light emitting portion 62B. Namely, the light passing through the second curved surface 62A2 is less likely to be diffused in comparison to the light passing through the first curved surface 62A1.

A portion of the light emitted from the LED 51 passes through the first curved surface 62A1. The portion of the light is diffused in the wide range and thus it is more likely to reach the lower light exit hole 32F for an entire length of the lower light exit hole 32F. The light passing through the second curved surface 62A2 is less likely to be diffused and thus more likely to reach the upper light emitting portion 62B.

As illustrated in FIG. 6, the upper surface of the upper light emitting portion 62B and the lower surface of the lower light emitting portion 62D have ridged shapes. With this configuration, light exiting from the upper light emitting portion 62B or the lower light emitting portion 62D to the outside of the lens 62 is refracted. As a result, a path of the light is adjusted. The shapes of the surfaces of the upper light emitting portion 62B and the lower light emitting portion 62D are not limited to the ridged shape and may be altered to different shapes.

With the configuration described above, the light emitted from the LED 51 enters the lens 62 through the light entrance surface 62A. A beam of the light in the lens 62 indicated by arrow L1 in FIG. 7 reaches the upper light emitting portion 62B and exits therefrom. A beam of light indicated by arrow L2 in FIG. 7 reaches the lower light emitting portion 62D and exits from the light emitting surface 62E of the lower light emitting portion 62D toward the armrest 14.

As illustrated in FIG. 4, the beam of light exiting from the upper light emitting portion 62B indicated by arrow L1 passes through the light exit hole 32E, enters into the well 30. With the beam of light, the inside of the well 30 is illuminated. The beam of light exiting from the lower light emitting portion 62D indicated by arrow L2 passes through the lower light exit hole 32F and travels toward the armrest 14 (or the switch base 16). With the beam of light, the switch base 16 and the switches arranged thereon are illuminated and thus the visibility of them improves. Namely, the upper area above the lens (the light guide member) 62 (i.e., the inside of the inside handle well 30) and the lower area below the lens 62 (or the switch base 16) can be illuminated by a single light source 50.

Beams of light exiting from parts of the lens 62 other than the upper light emitting portion 62B and the lower light emitting portion 62D are reflected by the inner surfaces of the upper cover 61 and the lower cover 63 (light reflecting surfaces) and travel back to the lens 62. A beam of light traveling in such a path is indicated by arrow L3 in FIG. 7. With the above configuration, the efficiency in use of light emitted from the LED 51 can be improved.

As illustrated in FIGS. 3 and 4, the light exit hole 32E is formed in an area of the lower wall 32A of the bezel 32 on the outer side of the interior of the vehicle than the handle 31A of the inside handle assembly 31 (more to the right in FIG. 4). The cover 33 has a protrusion 33A that protrudes toward the inner side of the interior of the vehicle. As illustrated in FIG. 3, the protrusion 33A is arranged more to the rear of the vehicle (or more to the left in FIG. 3) than the light exit hole 32E. The protrusion 33A functions as a light blocking portion that blocks light exiting from the light exit hole 32E toward the rear of the vehicle.

With the above configuration, beams of the light exiting from the light exit hole 32E and traveling toward the opening of the inside handle well 30 (or toward the inner side of the interior of the vehicle) are blocked by the handle 31A of the inside handle assembly 31 or by the protrusion 33A (the light blocking portion). Namely, the light exit hole 32E is blocked by the protrusion 33A and the handle 31A in sight of the occupant. A line of sight of the occupant is indicated by arrow E1 in FIG. 2 or 3.

With the above configuration, the occupant rarely see the light exit hole 32E and light exiting therefrom. When the occupant is seated, positions of his or her eyes are usually more to the rear of the vehicle than the inside handle well 30. Therefore, the protrusion 33A is arranged more to the rear than the light exit hole 32E. To make the light exit hole 32E further less likely to be directly seen by the occupant, the protrusion 33A may be arranged closer to the light exit hole 32E.

The inside handle well 30 is illuminated with the light exiting upward from the light source 50. Because the positions of eyes of the seated occupant are usually above the inside handle well 30, the light exiting upward from the light source 50 is more likely to be recognized by the occupant than the light traveling downward. In this embodiment, the light exiting upward is blocked by the handle 31A and the protrusion 33A. Therefore, the occupant is less likely to directly see the light exit hole 32E and the light exiting therefrom even though the light exit hole 32E is provided in the lower wall 32A (or the lower surface) of the inside handle well 30.

Next, the configuration of the light directing member 70 will be explained. As illustrated in FIG. 4, the light directing member 70 is arranged so as to cover the light emitting surface 62E (a light emitting surface of the light source) from below. As illustrated in FIGS. 6 and 7, the light directing member 70 is formed in a shape extending in the front-to-rear direction of the vehicle and attached to the lower cover 63. The light directing member 70 is a separated part (or a separate light directing part) from the lower cover 63.

The light directing member 70 includes mounting protrusions 71 and 72 formed at the respective ends with respect to the longitudinal direction thereof. The mounting protrusion 71 is fitted in a recess 66 in a wall portion of the lower cover 63. The mounting protrusion 72 is fitted in a recess 67 in a wall of the lower cover 63. As a result, the light directing member 70 is attached to the lower cover 63.

A means for attaching the light directing member 70 to the lower cover 63 is not limited to the mounting protrusions 71, 72 and the recesses 66, 67. The light directing member 70 may be attached to the lower cover 63 with screws. The light directing member 70 may be attached to the upper cover 61. The light directing member 70 may be integrally provided with the lower cover 63 (or the upper cover 61).

Figure 8:
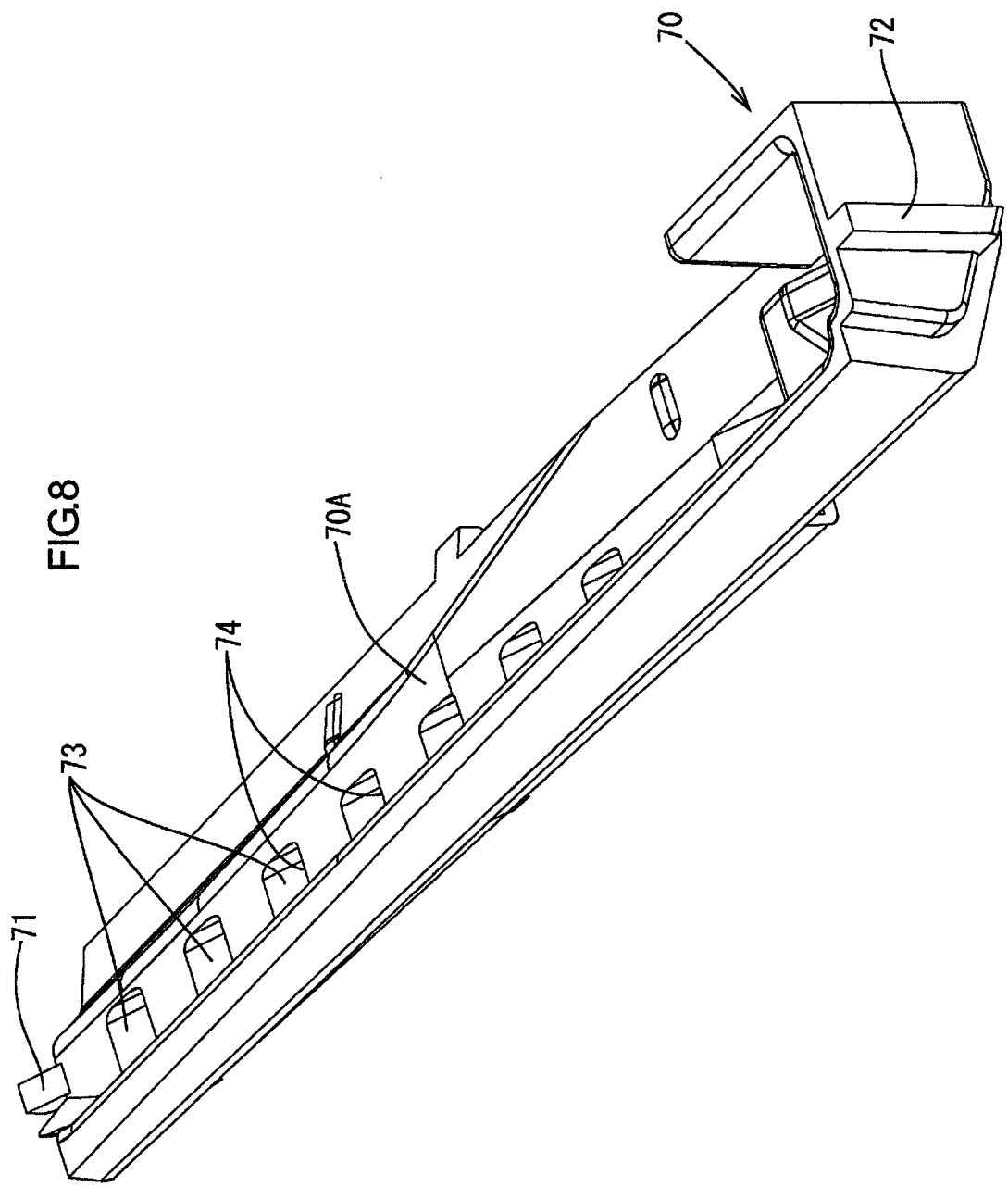
FIG. 8 is a perspective view of a light directing member.
Figure 9:
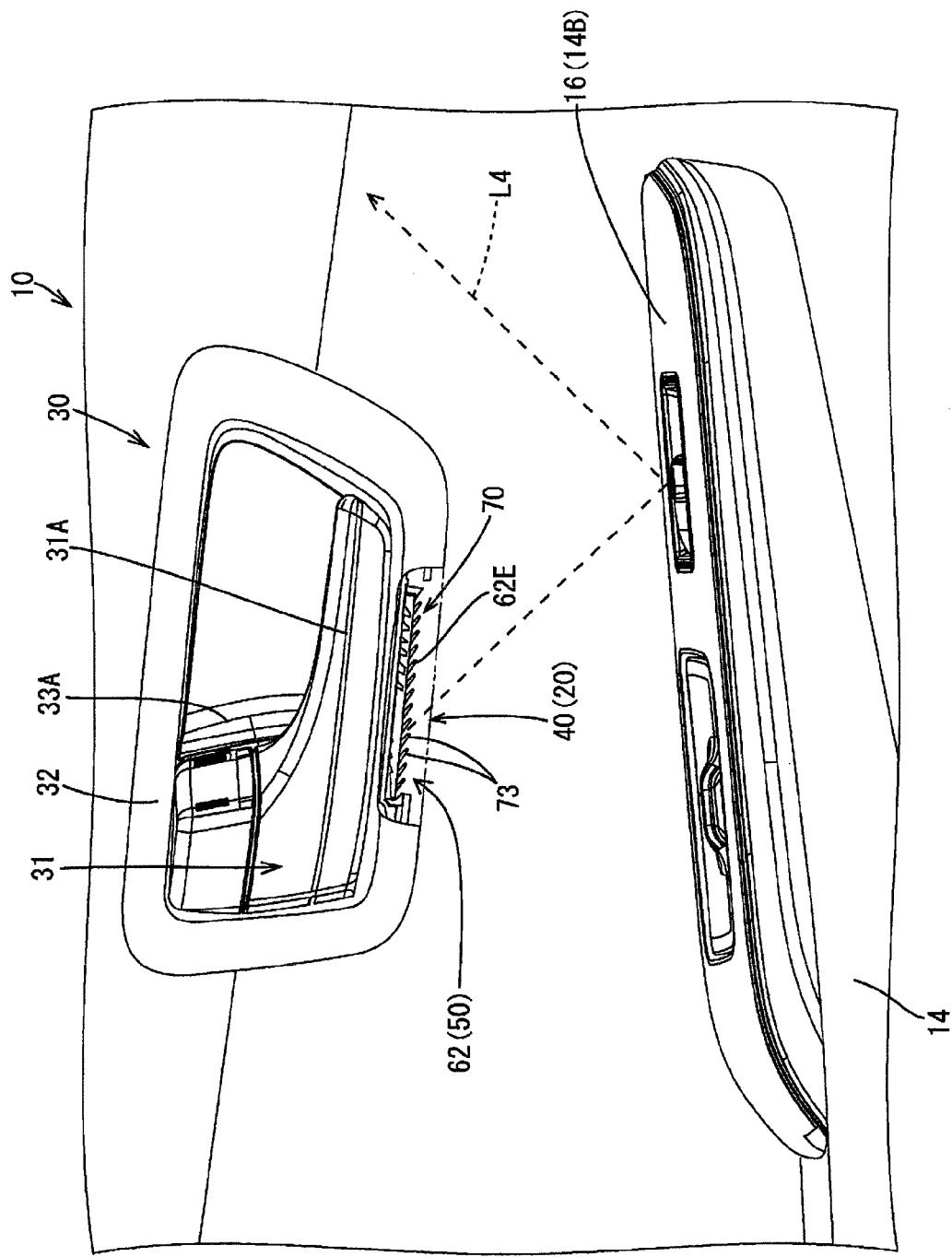
FIG. 9 is a magnified front view of the door trim in FIG. 1 illustrating a detailed configuration of the inside handle.
Figure 10:
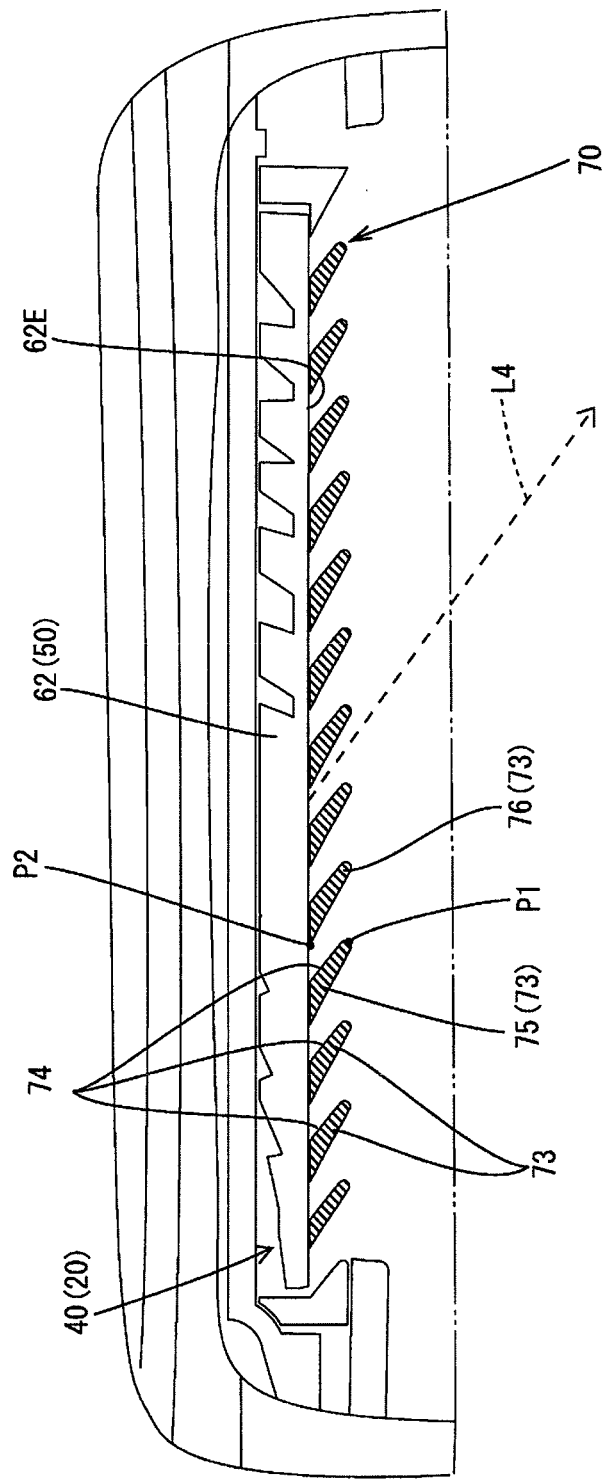
FIG. 10 is a magnified view of the door trim in FIG. 9 around the light directing member.

As illustrated in FIGS. 8 to 10, the light directing member 70 includes a bottom wall 70A and a plurality of tilted flaps 73 arranged on the bottom wall 70A in the front-to-rear direction of the vehicle. Each flap 73 is tilted such that the lower end thereof is more to the front (or the right side in FIGS. 9 and 10) than the upper end thereof. Namely, the flaps 73 are tilted with respect to the direction in which the light is emitted from the light emitting surface 62E of the lens 62 (the downward direction in FIG. 10). The flaps 73 cover the light emitting surface 62E of the light source 50 from the rear (the left side in FIGS. 9 and 10) and from below.

The flaps 73 are arranged separately from one another in the front-to-rear direction. In area between the adjacent flaps 73, a slit 74 is formed. The slit 74 extends all the way through the bottom wall 70A with the vertical axis thereof slanted such that the lower side thereof is closer to the front of the vehicle. Light passes through the slit 74.

The flaps are arranged such that the lower edge of each flap 73 and the upper edge of the adjacent flap 73 are located on the same line perpendicular to the light emitting surface 62E. In FIG. 10, a lower edge P1 of a first flap 75 and an upper edge P2 of a second flap 76 arranged adjacent to the first flap 75 are located on the same line perpendicular to the light emitting surface 62E. When the first flap 75 and the second flap 76 are viewed from below in the direction perpendicular to the light emitting surface 62E, a part of the light emitting surface 62E between the first flap 75 and the second flap 76 are blocked.

With the flaps 73, beams of light traveling toward the rear of the vehicle among beams of light emitting from the light emitting surface 62E toward the armrest 14 are blocked (or reflected toward the front of the vehicle) by the flaps 73. The light directing member 70 has a configuration that is able to direct the light emitted from the light emitting surface 62E toward the front of the vehicle.

"A configuration that is able to direct the light emitted from the light emitting surface 62E toward the front of the vehicle" refers to a configuration with which the beams of light emitted from the light emitting surface 62E toward the rear of the vehicle are blocked and only the beams of light emitted from the light emitting surface 62E toward the front of the vehicle exit from the light source unit 40 toward the armrest 14. It may refer to a configuration in which beams of light emitted from the light emitting surface 62E are reflected toward the front of the vehicle by the flaps 73.

The flaps 73 may be provided in a color having low light reflectivity, such as black, to efficiently block the beams of light emitted from the light emitting surface 62E toward the rear of the vehicle. The flaps 73 may be provided in a color having high light reflectivity, such as white, to efficiently reflect the beams of light emitted from the light emitting surface 62E toward the front of the vehicle.

As described above, the illumination device 20 includes the light directing member 70 configured to direct the beams of light emitted from the light emitting surface 62E toward the armrest 14 toward the front of the vehicle. With this configuration, the light emitted from the light source 50 is directed toward a specific direction (e.g., toward the front of the vehicle). The beam of light directed by the light directing member 70 (indicated by arrow L4 in FIGS. 9 and 10) is reflected toward the front of the vehicle by the armrest 14 (or the switch base 16). With this configuration, the beam of light reflected by the armrest 14 is less likely to travel toward the rear of the vehicle. Therefore, the beams of the light reflected by the armrest 14 (or the switch base 16) is less likely to reach the eyes of the occupant seated more to the rear of the vehicle than the armrest 14 (or the switch base 16). Namely, the occupant is less likely to be dazzled by the reflected light.

The light emitting surface 62E (the light emitting portion) extends in the front-to-rear direction of the vehicle.

With this configuration, an illumination area of the light emitted from the light emitting surface 62E can be expanded in the front-to-rear direction of the vehicle so as to correspond to the armrest 14 that extends in the front-to-rear direction of the vehicle. Therefore, the armrest 14 can be properly illuminated.

The light directing member 70 includes a plurality of the tilted flaps 73, each of which is tilted such that the lower end thereof is more to the front than the upper end thereof. The flaps 73 are arranged in the front-to-rear direction of the vehicle.

The light emitting surface 62E is covered by the flaps 73 from below and from the rear. The beams of light traveling toward the rear of the vehicle among the beams of light emitted from the light emitting surface 62E toward the armrest 14 are blocked (or reflected toward the front of the vehicle) by the flaps 73. The beams of light emitted from the light emitting surface 62E are directed toward the front of the vehicle.

The lower edge P1 of the first flap 75 and the upper edge P2 of the second flap 76 are located on the same line perpendicular to the light emitting surface 62E.

With this configuration, no gap is created between the first flap 75 and the second flap 76 when viewed in the direction perpendicular to the light emitting surface 62E. Namely, the light emitting surface 62E is covered by the flaps 73 from below and from the rear without gaps and the beams of light emitted between the flaps are further less likely to be directed toward the rear of the vehicle.

If the surface (the upper surface 14B) of the armrest 14 (or the switch base 16) is polished and has high light reflectivity, the mirror image of the light emitting surface 62E may appear on the surface of the armrest 14 (or the switch base 16). With the flaps 73, such a problem is less likely to occur.

The light source 50 includes the LED 51 (the main component) and the lens 62 configured to direct light from the LED 51 toward the armrest 14. The light source unit 40 includes the upper cover 61 and the lower cover 63 holding the LED 51 and the lens 62 therebetween. The light source unit 40 further includes the light directing member 70 attached to the lower cover 63 (or the upper cover 61).

The light source unit 40 has the above configuration, that is, the light directing member 70 is attached to the lower cover 63 (or the upper cover 61) housing the LED 51 and the lens 62. Namely, the light source 50 (the LED 51 and the lens 62) and the light directing member 70 are provided as a single unit, that is, the light source unit 40 included in the illumination device 20. In comparison to a configuration in which the light source 50 and the light directing member 70 attached separately to a mounting base (e.g., a door trim), the light source 50 and the light directing member 70 can be more easily attached to the mounting base. By providing the LED 51, the lens 62, and the light directing member 70 as a single unit (i.e., the light source unit 40), the illumination unit 20 can be easily mounted to various kinds of door trims.

The light directing member 70 is provided as a separate part from the covers 61 and 63 and attached to either one of the covers 61 and 63.

Because the light directing member 70 is provided as a separate part from the covers 61 and 63, the light directing member 70 can be easily replaced. Namely, the light directing member 70 can be replaced by another kind of light directing member according to a configuration of an armrest (e.g., a location and a shape) or a configuration of functional parts, such as switches, on the armrest. The different kind of the light directing member may include flaps tilted at a different angle from the angle at which the flaps 73 are tilted. By using the light directing member according to the configurations of the armrest and the functional parts, a direction of light can be adjusted. The illumination device 20 (or the light source unit 40) can be easily configured for various kinds of door trims.

The light source unit 40 mounted to the door trim 10 includes the LED 51, the lens 62, the covers 61, 62, and the light directing member 70. The lens 62 is configured to guide light emitted from the LED 51. The upper cover 61 and the lower cover 63 hold the LED 51 and the lens 62 therein. The light directing member 70 is attached to the lower cover 63 so as to cover the light emitting surface 62E of the lens 62. The light directing member 70 includes the flaps 73 tilted with respect to the direction in which the light is emitted from the light emitting surface 62E of the lens 62.

The beams of light emitted from the light emitting surface 62E toward the flaps 73 are directed along the directions parallel to tilted surfaces of the flaps 73. The beams of light emitted from the light emitting surface 62E are directed in the direction angled to the direction in which the beams of light are emitted (or directed toward a specific direction).

Second Embodiment

Figure 11:
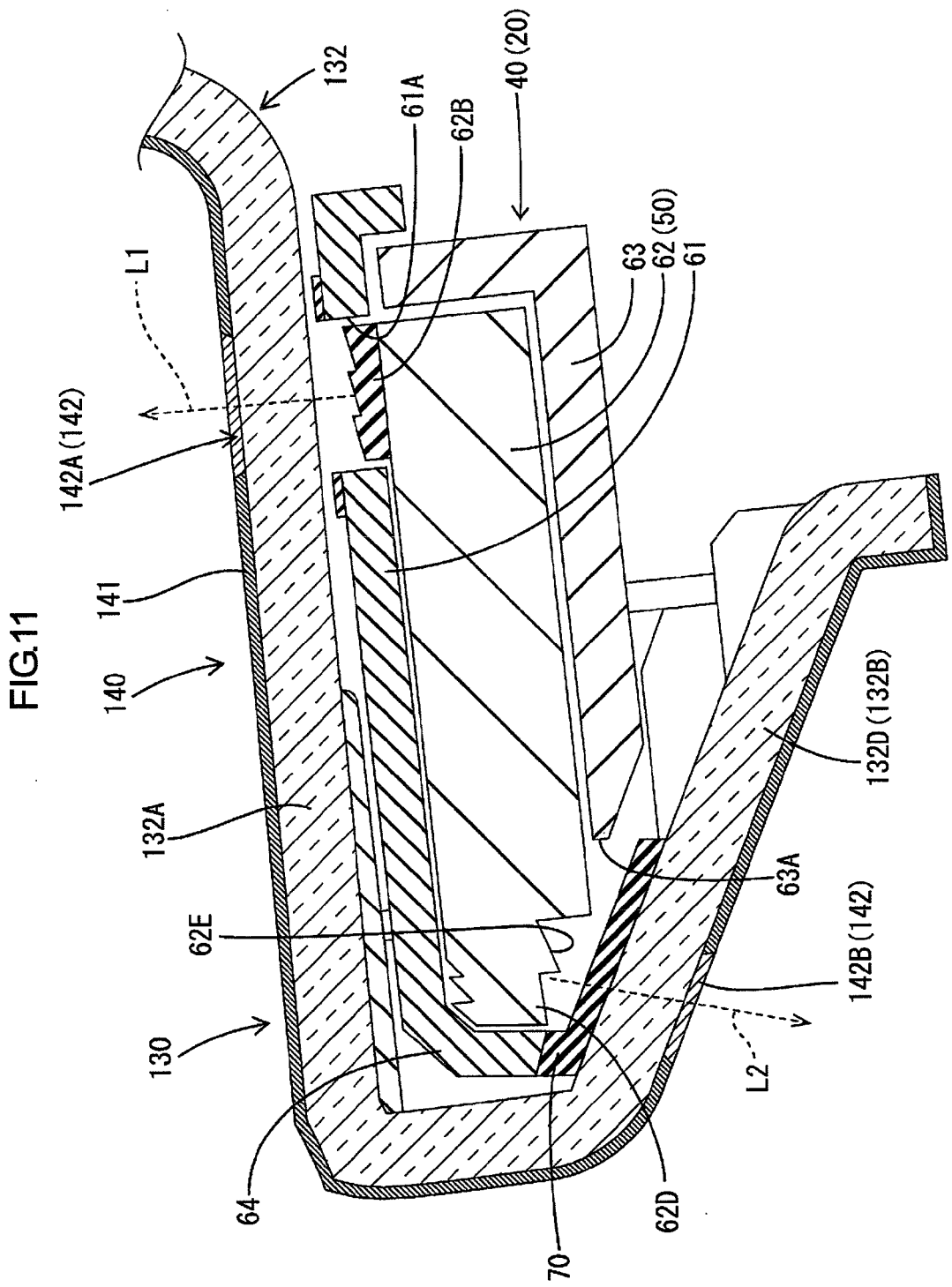
FIG. 11 a cross-sectional view illustrating a modification.

The fourth embodiment will be explained with reference to FIG. 11. The same parts as those in the first embodiment will be indicated by the same symbols and will not be explained. In the first embodiment, the light exit hole 32E and the lower light exit hole 32F of the inside handle well 30 are configured such that beams of light pass therethrough. In this embodiment, light exit portions are provided without the light exit hole 32E and the lower light exit hole 32F.

A bezel 132 of an inside handle well 130 includes a lower wall 132A, a lower wall 332 and a sloped wall 132D. The bezel 132 is made of synthetic resin having a high capability of light transmission (or highly transparent synthetic resin) such as acrylic and polycarbonate. Surfaces of the bezel 132 on the inner side of the interior of the vehicle have light transmissive areas 142 and light blocking areas 141.

The light transmissive areas 142 are provided in portions of the bezel 132 opposite the upper light emitting portion 62B and the lower light emitting portion 62D of the light source 50, respectively. The bezel 132 has a light blocking areas 141 on an outer surface of a portion thereof other than the portions in which the light transmissive areas 142 are provided. In FIG. 11, the light transmissive area 142 provided in the portion opposite the upper light emitting portion 62B is indicated by symbol 142A, the light transmissive area 142 provided in the portion opposite the lower light emitting portion 62D is indicated by symbol 142B.

The light transmissive areas 142 may be formed of material having a high capability of light transmission or by reducing the thickness so that light can pass therethrough.

The bezel 132 is made of material having a high capability of light transmission and has the light transmissive area 142A (a light exit portion) and the light transmissive area 142B. With this configuration, the space above the light source 50 (the inside of the inside handle well 130) and the space below the light source 50 (the armrest 14) are illuminated. In this embodiment, the bezel 132 is made of the material having high capability of light transmission and the light transmissive areas 142A and 142B are provided instead of the light exit hole 32E and the lower light exit hole 32F of the first embodiment.

Other Embodiments

The present invention is not limited to the above embodiments explained in the above description and the drawings. The technology described herein may include the following embodiments.

(1) In the above embodiments, the light from the light source 50 is directed toward the front of the vehicle by the flaps 73 of the light directing member 73. However, the light directing member 70 may have a different configuration for directing light from the light source 50 toward the front. For example, the light directing member 70 may be configured to refract light from the light source 50 toward the front. The light directing member 70 may include a film configured to control a travel direction of light emitted from the light source 50, such as a light control film.

(2) In the above embodiments, the light directing member 70 is attached to the cover, that is, integrally provided with the light source 50. However, the light directing member 70 can be attached to a different part as long as it covers the light emitting portion of the light source 50. For example, the light directing member 70 may be attached to an interior part such as the bezel 32 and the door trim 10. The light directing member 70 may be integrally provided with the interior part such as the bezel 32 and the door trim 10.

(3) The light source 50 includes the LED 51 (the main component) and the lens 62 (the light guide member). However, the configuration of the light source 50 is not limited to such a configuration. The light source 50 may not include the lens 62. In that case, the inside of the armrest 14 is illuminated directly by the LED 51. The main component can be other type of light source such as a light bulb.

(4) In the above embodiments, the inside of the inside handle well 30 is illuminated with the light emitted from the upper light emitting portion 62B. However, other components may be illuminated with the light. Furthermore, the light source 50 may be configured to illuminate only the armrest 14.

(5) In the above embodiments, the light source unit 40 is mounted to the door trim 10. However, the interior part to which the light source unit 40 is mounted is not limited to the door trim 10. The light source unit 40 may be attached to a pillar garnish or an instrumental panel.

(6) In the above embodiments, the light emitting surface 62E is provided as a light emitting portion of the light source 50. The light emitting portion of the light source 50 is not limited to the light emitting surface or a planar shape.

(7) In the above embodiments, the light from the light source 50 is directed (or guided) toward the front of the vehicle by the light directing member 70. However, the direction in which the light is directed (or guided) is not limited to the front. The light directing member 70 may be configured to direct the light in any direction.

(8) The light guide member configured to guide light from the LED 51 toward the armrest 14 is not limited to the lens 62. For example, a prism may be used for the light guide member. The light from the LED 51 may be refracted by the prism toward the armrest 14. Furthermore, an optical member in which total internal reflection occurs, such as an optical fiber and a light guide plate, may be used for the light guide member. In such an optical member, beams of light from the LED 51 are totally reflected inside and directed toward the armrest 14.

The invention claimed is:

1. An illumination device for a vehicle, the illumination device configured to illuminate an armrest on a door trim of the vehicle, comprising:
   a light source arranged above the armrest and having a light emitting portion configured to emit light toward the armrest; and
   a light directing member arranged so as to cover the light emitting portion from below and configured to direct the light emitted from the light emitting portion toward the armrest toward a front of the vehicle.

2. The illumination device according to claim 1, wherein the light emitting portion extends along a front-to-rear direction of the vehicle.

3. The illumination device according to claim 1, wherein the light directing member includes a plurality of flaps arranged in the front-to-rear direction of the vehicle, each of the flaps is tilted such that a lower end thereof is more to a front than an upper end thereof.

4. The illumination device according to claim 3, wherein the light emitting portion is a light emitting surface, and
   the flaps are arranged such that a lower edge of the flap and an upper edge of the flap immediately behind are on a same line perpendicular to the light emitting surface.

5. The illumination device according to claim 1, wherein the light source includes a main component configured to emit light, a light guide member configured to guide the light emitted from the main component toward the armrest, and a cover housing the main component and the light guide member, and
   the light directing member is provided on the cover.

6. The illumination device according to claim 5, wherein the light directing member is a separate part from the cover and attached to the cover.

7. A light source unit to be mounted to an interior part of a vehicle, the light source unit comprising:
   a main component configured to emit light;
   a light guide member having a light emitting portion and configured to guide light emitted from the main component;
   a cover housing the main component and the light guide member; and
   a light directing member attached to the cover so as to cover the light emitting portion of the light guide member and including a flap tilted with respect to a direction in which light is emitted from the light emitting portion of the light guide member.

* * * * *